I. BULLOCK
Car Truck.
No. 2,316.
Patented Oct. 11, 1841.
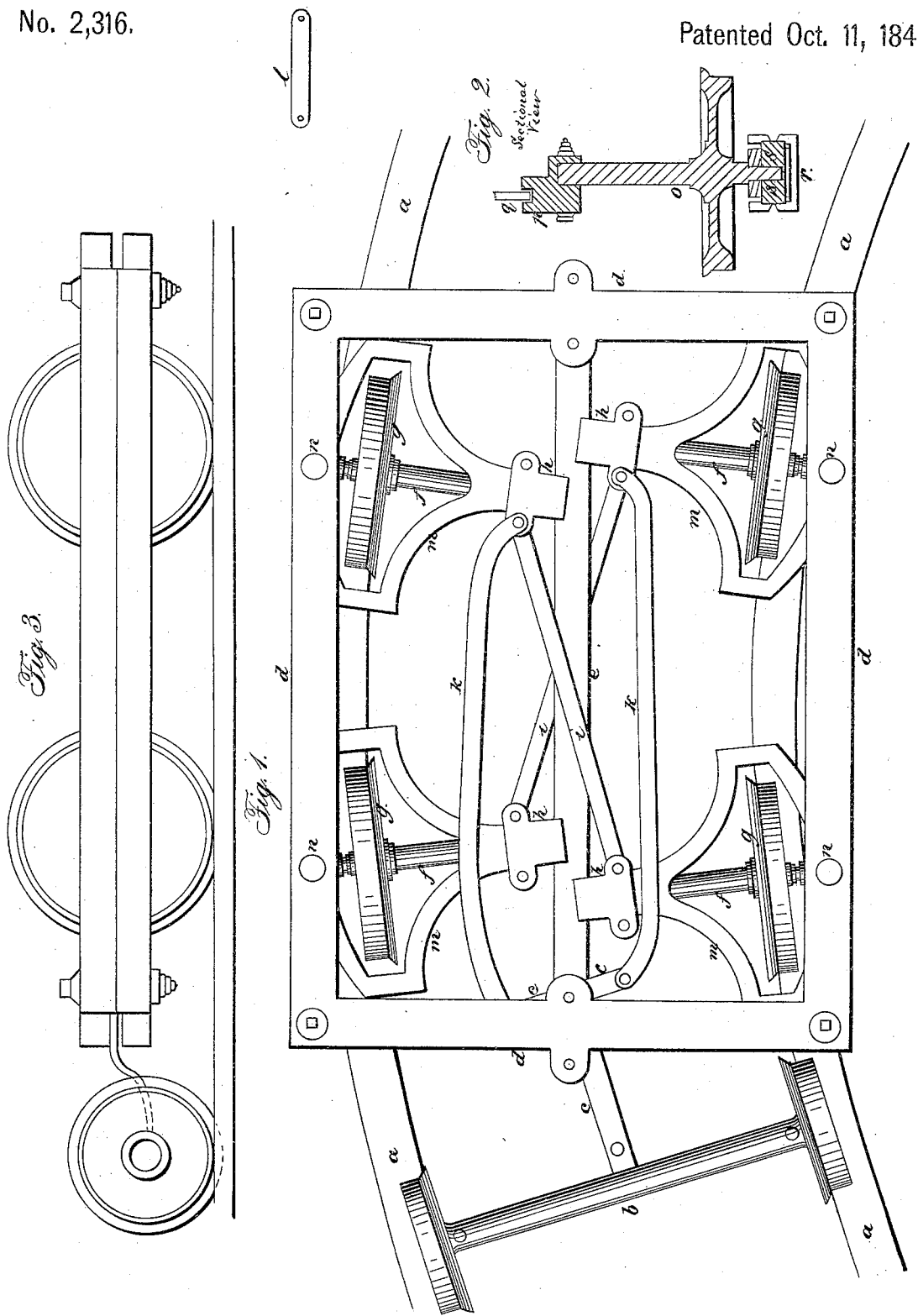

UNITED STATES PATENT OFFICE.

ISAAC BULLOCK, OF NEW YORK, N. Y., ASSIGNOR TO PERRY G. GARDINER.

RAILROAD-CAR WHICH CAN ACCOMMODATE ITSELF TO THE CURVES ON THE ROAD.

Specification of Letters Patent No. 2,316, dated October 11, 1841.

*To all whom it may concern:*

Be it known that I, ISAAC BULLOCK, of the city of New York, in the State of New York, have invented an improvement in the manner of constructing railroad-cars for running on any and every railroad with equal facility, whether curved or straight, which improved car I denominate "the moving-axle car"; and I do hereby declare that the following is a full and exact description thereof.

On each of my cars, I use a double set of axles, each axle extending to, and meeting the opposite axle in the middle of the car, so that each wheel may run separate and independent of the other, the inner end of each axle receiving its bearing in a slide formed for the purpose of moving backward or forward, as the position of the curve may require; this slide rests on a flat bar running lengthwise through the middle of the car. The slides are connected together by means of levers or bars running from the inner end of each forward axle to the inner end of the opposite after axle; and by levers or bars running from the lever which connects the car with the car next in advance (which lever is in the form of a letter T) to the inner end of each after axle, or (as circumstances may sometimes require) to the inner end of each forward axle. The cars are attached together by means of the lever (just referred to) made in the form of a letter T; the foot of the T is attached by a bolt to the forward car, and the center of the cross, in a similar manner, to the after car, while the extremities of the arms or cross are also, in like manner, attached to the aforesaid levers which connect this lever T with the slides or axles. When I use my car as a truck for a locomotive, I deem it best to use leading wheels, as represented in the drawing, to which to attach the lever T. This lever T, instead of connecting the car with the next preceding car or leader, may, when two or more trucks are used for carrying one frame (as is usual in long cars) connect the said trucks with the said frame, which will answer the same purpose as if attached to the preceding car or leader; in which case the cars may be connected together in the ordinary way. The outer end of each axle receives its bearing in a box, attached by a pivot to the frame of the car to prevent its moving except to turn with the shaft. This box is connected with the slide on the inner end of the axle, by means of circular braces which pass around the wheel.

Although my improvement has nothing to do with the mode of fastening the springs of the car upon the frame, yet it may be well to observe that I deem it best to drill a hole in the end of the pivots last mentioned (which pass up through the frame) a hole say one inch in diameter and four to six inches deep to receive the fastening of the spring, which may be a bolt.

In the accompanying drawing, Figure 1, represents the plan of the car on a curved track; Fig. 2, a sectional view of the wheel and shaft as connected with the slide and box; Fig. 3, a side view of the car on the track.

In Fig. 1, $a, a, a, a$, represent the track; $b$, the leader; $c$, the lever for connecting the cars, made in the form of a T; $d$, the frame of the car; $e$, the bar which passes lengthwise through the middle of the car, on which the slides move; $f, f, f, f$, the axles; $g, g, g, g$, the wheels; $h, h, h, h$, the slides; $i, i$, the levers or bars connecting the slides, $k, k$, the levers or bars connecting the lever $c$ with the slides; $l$, a short lever to be used in the place of $k, k$, when it is necessary to connect $c$ with the forward slides; $m, m, m, m$, the circular braces which go around the wheels connecting the boxes and slides; $n, n, n, n$, the upper pivots on which the boxes turn in the frame of the car.

In Fig. 2, $o$ represents a section of the shaft and wheel; $p$, the slide; $q$, the edge of the middle bar of the car; $r$, a section of the frame of the car; $s$, the box and pivot.

From the above description and the drawing, the operation of the whole will be perceived to be this: In passing around a curve, the leader or forward car will cause the lever $c$, to incline, from a parallel direction with the following car, to an angle with it; in taking which position, the said lever $c$ causes an inclination of the shafts and wheels by means of the levers $k, k$, and $i, i$;—an inclination which brings the plane of each wheel constantly parallel to the track at every successive point on which it is running; and the opposite wheels being on separate shafts, the outside wheel may turn faster (as it should do) than the inside wheel. The operation is the same, in effect, when the lever $c$, instead of connecting two successive cars, connects the trucks of a long car with the frame of said long car. For, the moment the forward truck makes an angle with the frame (which it does as soon as it touches the curve) the said lever $c$ assumes the same inclination with the truck, as it did in the other case with the car, and keeps the plane of each wheel parallel with the track where it is running, at each successive point.

Having thus fully described the nature of my invention and shown how the same is to be carried into operation, I do hereby declare that I do not claim the mere cutting of the axle into two parts so as to run independently of each other, nor do I claim running each wheel in a separate vibrating frame connected with the frames of the other wheels by means of connecting rods, these having been done, but without the further connection hereafter claimed; but—

What I do claim as constituting my invention and desire to secure by Letters Patent, is—

So connecting the sliding boxes (or the frames in which the wheels revolve), by means of connecting rods, with a lever in the form of a cross or letter T (which connects the car with the next preceding car, or which, in case two or more trucks carry one frame, may connect the said trucks with the said frame) as to adjust all the wheels simultaneously and enable them to receive the adjustment from the preceding car or leader or from the frame of the car itself when two or more trucks carry one frame, all substantially as herein described.

ISAAC BULLOCK.

Witnesses:
CHAS. DUBOIS,
S. W. BULLOCK.